United States Patent [19]

Grodkiewicz et al.

[11] 4,407,061
[45] Oct. 4, 1983

[54] FABRICATION PROCEDURE USING ARSENATE GLASSES

[75] Inventors: William H. Grodkiewicz, New Providence; Shobha Singh, Summit; LeGrand G. Van Uitert, Morristown, all of N.J.

[73] Assignee: Bell Telephone Laboratories, Incorporated, Murray Hill, N.J.

[21] Appl. No.: 270,504

[22] Filed: Jun. 4, 1981

[51] Int. Cl.³ .................. C03C 3/12; C03C 3/26; B05D 1/34
[52] U.S. Cl. .................. 29/576 B; 501/84; 501/86; 501/22; 501/141; 148/1.5; 204/192 S; 204/192 SP; 204/192 D; 427/82; 427/126.3; 427/248.1
[58] Field of Search ............. 29/576 B; 148/1.5; 204/192 S, 192 SP, 192 D; 106/41, 42, 45, 49; 427/82, 126.3, 248.3

[56] References Cited

U.S. PATENT DOCUMENTS

| | | | |
|---|---|---|---|
| 2,084,747 | 6/1937 | Rosenberg | 106/36.1 |
| 3,432,417 | 3/1969 | Davidse et al. | 204/192 D |
| 3,837,866 | 9/1974 | Malmendier et al. | 106/47 R |
| 3,885,975 | 5/1975 | Malmendier et al. | 106/47 R |
| 3,888,685 | 6/1975 | Kaes | 106/47 R |
| 4,091,171 | 5/1978 | Ohta et al. | 427/248.1 |

FOREIGN PATENT DOCUMENTS 1496564 11/1969 Fed. Rep. of Germany.

OTHER PUBLICATIONS

Park et al., IBM-J. Research & Development, 22, (1978), 607-612.
Campbell, Vacuum, 27, (1977), 213-224.
Wikorczyk et al., Thin Solid Films, 58, (1979), 313.

*Primary Examiner*—Upendra Roy
*Attorney, Agent, or Firm*—Walter G. Nilsen

[57] ABSTRACT

A fabrication technique is described for making various devices in which a certain type of glass is used as a surface protection layer. The glass layers are formed by particle bombardment (generally sputtering or E-beam) of a glass target. Devices with such surface layers are also described. Such glass layers are highly advantageous as encapsulating layers, diffusion barrier layers, etc., particularly for optical type devices and certain semiconductor devices. Particularly important is the preparation procedure for the glass target used in the bombardment process. The glass layers are moisture stable, act as excellent barriers against diffusion, and are usable up to quite high temperatures (i.e., in diffusion doping procedures) without cracking or peeling. The glass layers also provide long-term protection against atmosphere components including water vapor, oxygen, atmosphere pollution contaminants, etc., and can be removed by standard etching techniques.

45 Claims, 4 Drawing Figures

LIGHT

FABRICATION PROCEDURE USING ARSENATE GLASSES

TECHNICAL FIELD

The invention involves the use of certain glasses in the fabrication of various devices and the use of certain glasses in the structure of these devices.

BACKGROUND OF THE INVENTION

The fabrication of some devices often requires protective layers for surface protection and pattern delineation. Such surface layers are useful during fabrication as well as on completed devices. Requirements for such films differ widely depending on the particular fabrication procedure, material, etc. Usually, adherence, stability (particularly toward moisture), and effectiveness as a diffusion barrier are of principal importance. Also, stability, adherence, etc., at high temperatures are desirable where high temperatures are used during fabrication of the device or on subsequent use of the device. In addition, with some applications and fabrication procedures, it might be advantageous for the protective layer to be at least partially transparent to radiation including radiation in the infrared, visible, ultraviolet, X-ray and gamma ray regions.

Optical devices are becoming of increasing importance commercially, principally because of the development of optical communications systems and certain types of display systems. Because of these developments, various optical devices including semiconductor optical devices are becoming increasingly important so that economic and effective techniques for manufacturing such devices are in great demand. Coatings that are suitable for use on optical devices including semiconductor optical devices are highly desirable. Such coatings should be stable, unaffected by ordinary atmosphere substances such as moisture, chemicals, etc., adherent and be able to withstand temperatures used to fabricate the devices or in the use of the devices. Such glass coating should also be readily removable by a convenient procedure. In many devices, the coating should also be transparent at various parts of the radiation spectrum. Where the coating is used to encapsulate optical devices, it should be transparent to the part of the radiation spectrum where they operate. Exemplary optical devices are light-emitting diodes, lasers and optical detectors. The coatings may also be used as reflection coatings to increase or decrease reflection of radiation on the surface of semiconductor optical devices. Indeed, in a general sense, the thickness and optical properties of a glass layer can be adjusted to either increase transmission of the device (e.g., for light-emitting diodes or optical detectors) or increase the reflectivity of the coatings (e.g., for laser applications, etc.).

It should be remarked that the term "optical" is used in a broad sense and is not limited to only visible radiation. The term optical radiation refers to any useful radiation and includes, in addition to visible radiation, infrared radiation, ultraviolet radiation, X-ray and gamma ray radiation, etc.

In the fabrication of some devices it is advantageous to have protective layers that are transparent to radiation. For example, it might be advantageous to observe the surface under the protective layer during processing or at various steps during the processing.

Typical semiconductor devices are described in a variety of references including *Light-Emitting Diodes* by A. A. Bergh and P. J. Dean, Clarenden Press, 1976 and *Injection Electroluminescent Devices* by C. H. Gooch, John Wiley and Sons, New York, 1973. Other useful references include *Semiconductors and Semimetals*, edited by R. K. Willardson and A. C. Beer, Academic Press, 1966, Vol. 2; *Physics of III–V Compounds*, and *Physics of Semiconductor Devices* by S. M. Sze, Wiley-Interscience, New York, 1969. These references contain descriptions of various devices including semiconductor lasers, optoisolators, light-emitting diodes, light detectors, solar cells, etc.

SUMMARY OF THE INVENTION

The invention is based on the discovery that glasses containing significant amounts of pentavalent arsenic oxide have unusually good properties for use in fabricating certain types of devices. The invention includes a procedure for making such arsenate glasses.

The invention is a process for fabricating a device in which a pentavalent arsenic glass is used as a surface protection layer for at least part of the process. The glass is put down typically by a particle bombardment procedure such as sputtering or an E-beam procedure using an arsenate glass target. The glass consists of from 10 to 50 mole percent pentavalent arsenic oxide ($As_2O_5$) remainder selected from a number of oxides including indium oxide, thallium oxide, gallium oxide, zinc oxide, cadmium oxide, copper oxide, germanium oxide, phosphorous oxide, tellurium oxide, lead oxide, bismuth oxide and alkali-metal oxides. Particularly valuable is a glass comprising 15 to 50 mole percent $As_2O_5$, mole ratio $Ga_2O_3/As_2O_5$ from 0.5 to 1.4, remainder $In_2O_3$. Another interesting glass is made up of 70 to 90 mole percent $GeO_2$, remainder $As_2O_5$. These glasses are highly useful in the fabrication of devices, particularly as diffusion masks, encapsulating layers, lenses, insulating layers, etc. The arsenate glass target is made by a special procedure to ensure that the arsenic remains in the pentavalent state and is chemically reacted with other oxides in the glass composition. The arsenic is preferably introduced as $H_3AsO_4$ and the procedure arranged so that the pentavalent arsenic reacts with other substances in the glass before possible conversion of the pentavalent arsenic to trivalent arsenic. Such glasses yield excellent layers in the fabrication of devices both as temporary layers as in a mask for diffusion doping and as an encapsulating layer to protect the operating device from outside influences or contamination.

DETAILED DESCRIPTION

Figure 1:
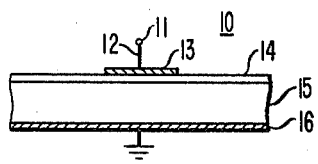
FIG. 1 shows an idealized structure for a metal-insulator-semiconductor structure.

The invention involves the composition of glasses useful in the fabrication of devices where the glasses are put down on a surface by a particle bombardment procedure (sputtering, E-beam, etc.). The invention is based on the discovery that significant amounts of pentavalent arsenic oxide in a glass composition yield glasses of unusually desirable properties such as stability, effectiveness as a diffusion mask, adherence, etc. The preferred composition involves inclusion in the glass composition of pentavalent arsenic oxide in amounts between 10 and 50 mole percent. Above 50 mole percent, the glass often becomes crystalline or at least partially crystalline. Below 10 mole percent, the beneficial qualities of the glasses attributable to the pentavalent arsenic glass are not easily apparent. The remaining ingredients are conventional oxides often found in glasses including indium oxide, gallium oxide, zinc oxide, cadmium oxide, copper oxide, germanium oxide, phosphorous oxide, tellurium oxide, lead oxide, bismuth oxide and certain alkali-metal oxides (lithium, sodium, potassium, rubidium and cesium).

Binary glass is formed between the pentavalent arsenic oxide and the oxides of the following metals: sodium, potassium, rubidium, cesium, boron, phosphorous, germanium and tellurium. Ternary glasses comprising pentavalent arsenic oxide and gallium oxide are formed with the above oxides and also the oxides of the following metals: lithium, beryllium, vanadium, copper, zinc, strontium, molybdenum, silver, cadmium, indium, barium, thallium, lead and bismuth. Small amounts (typically 0–10 mole percent) of other oxides may be incorporated into the glasses without affecting glass properties. Often, part or all of the gallium oxide is replaced by indium oxide. Various glasses are sometimes colored black indicating some reduction in valence. Such glasses might include those containing oxides of copper, vanadium, molybdenum and tellurium. Such properties might be useful in various applications or might be altered by oxidation under certain conditions.

In the practice of the invention, a target glass is made and this target glass used in a particle bombardment procedure to coat at least part of a surface of a device with the glass. The invention involves both the composition of this target glass and the procedure for making the target glass. Such procedure is of importance to ensure that the pentavalent arsenic oxide reacts with other ingredients in the glass before the arsenic is reduced to a lower valence state.

Preparation of the glass targets may be carried out in a variety of ways provided the pentavalent arsenic is not reduced. This often occurs because pentavalent arsenic oxide decomposes before reacting with other ingredients of the glass. Because $As_2O_5$ decomposes at a relatively low temperature, (about 315 degrees C.) the preparation procedure should be such that reaction occurs between pentavalent arsenic and other ingredients below this temperature.

In the preparation of these glasses, it is preferred to use arsenic acid ($H_3AsO_4$) as the source of pentavalent arsenic. Although other sources of pentavalent arsenic might be useful, arsenic acid has several advantages. It melts at a low temperature (35 degrees C.) before it decomposes so that the other ingredients present are wetted. This permits reaction at a relatively low temperature before the arsenic acid decomposes and before the pentavalent arsenic reduces to the trivalent state. Indeed, with some ingredients useful in the glasses, reaction takes place at room temperature. It is believed that these reactions form arsenate structures which are relatively stable.

The source materials for the other oxides in the glass composition are any compounds which yield the oxides on heating. Typically, they are hydroxides, oxides and carbonates of the cations to be incorporated in the glass. Extremely high purity is not critical to making the glass, but such purity might be important for some applications. Typically 99.9 or 99.99 percent purity is used but less pure starting materials usually will serve as well.

The ingredients for the glass, including the arsenic acid, are combined and mixed together. Often excess $H_3AsO_4$ is used and excess $As_2O_5$ allowed to evaporate on heating. Reasonably good mixing is advantageous and any mixing procedure used to achieve this end yields excellent results. Typical mixing procedures are ball milling, blowing, hand mixing by stirring, mortar and pestle, etc. Often, excess $H_3AsO_4$ is added to ensure good homogeneity of the mixture since this compound melts and forms a liquid at low temperatures. The excess $As_2O_5$ over 50 mole percent usually evaporates during the heat treatment of the oxide mixture. The content of $As_2O_5$ in the glass is reduced by keeping the mixture at elevated temperatures for extended periods of time.

The glass targets are made by fusing (heating) the sample mixtures in a suitable container (i.e., platinum crucible). A lid is usually used to close the container and prevent excessive loss of reactants. The mixture is heated to between 1225 and 1350 degrees C. for a suitable period of time, generally at least one minute. Typical times range from 5 minutes to 2 hours. Below 1225 degrees C., reaction might not be complete; above 1350 degrees C., there are no particular benefits, and there might be excessive loss of reactants. Very short times might not permit complete reaction and over two hours, while not necessarily harmful, is wasteful of time of time. The heating cycle is carried out in air. Preferred temperature range is from 1275 to 1325 degrees C. for 10 to 20 minutes.

A variety of methods are useful in forming the glass film from the glass target material. Generally, these methods may be grouped under the heading of particle bombardment methods and usually have the common characteristic of leaving the glass structure unchanged in transferring material from the glass target to the surface being coated with glass film. Typical decomposition procedures are sputtering and E-beam deposition. These deposition procedures involve particle beams which remove clusters of atoms without disturbing the predominant atomic arrangement of the atoms in the glass.

Because of convenience and the ability to closely control the deposition process, it is generally preferred that the deposition be carried out by sputtering. Various sputtering procedures may be used but the procedure outlined by D. D. Davidse and L. I. Maissel in *Journal of Applied Physics* 37, 574 (1966) is most useful. An r.f. sputtering procedure is used. Generally argon is used as the sputtering gas with a trace of oxygen. Typical pressure is $1-10 \times 10^{-3}$ Torr and typical input power is 200–300 Watts.

For some applications, particularly where freedom from foreign substances is highly desirable, electron beam methods of producing glass layers is also useful. Here an electron beam is used as the particle bombardment beam. Ways of ensuring low porosity and low strain for the deposited glass layers are outlined by K. C. Park and E. J. Weitzman, *IBM Journal of Research and Development,* Vol. 22, No. 6 November, 1978. Methods of producing glass layers by particle bombardment methods and other methods are outlined in *Handbook of Thin Film Technology,* Edited by Leon I. Maissel and Reinhard Glang, McGraw Hill, New York, 1970.

Certain compositions yield unusually good quality glasses for a number of applications. These compositions are expressed as a range of mole ratios of gallium oxide (or indium oxide) to pentavalent arsenic oxide, a range of concentration of pentavalent arsenic oxide in units of mole percent and a range of composition of a third component (if present) in terms of mole percent.

Compositions which include both $As_2O_5$ and $Ga_2O_3$ and a third component to be outlined below form unusually desirable glasses for a variety of applications. Several typical compositions are given below:

1. 20 to 50 mole percent $As_2O_5$, ratio of $Ga_2O_3/As_2O_5$ from 0.67 to 1.11, remainder oxides of silver, copper and/or thallium.
2. 33 to 50 mole percent $As_2O_5$, ratio of $Ga_2O_3/As_2O_5$ from 0 to 1.0, remainder oxides of lithium, potassium, sodium, rubidium and/or cesium.
3. 15 to 50 mole percent $As_2O_5$, ratio $Ga_2O_3/As_2O_5$ from 0.5 to 1.11, remainder one or more oxides of beryllium, barium, cadmium, lead, strontium and zinc.
4. 15 to 50 mole percent $As_2O_5$, ratio $Ga_2O_3/As_2O_5$ from 0.5 to 1.4, remainder one or more oxides of bismuth, indium, molybdenum and vanadium.
5. 10 to 50 mole percent $As_2O_5$, ratio $Ga_2O_3/As_2O_5$ less than 1.35, remainder $TeO_2$.
6. 20 to 38 mole percent $As_2O_5$, ratio $Ga_2O_3/As_2O_5$ from 0.75 to 1.6, remainder $GeO_2$.
7. 70 to 90 mole percent $GeO_2$, 10 to 30 mole percent $As_2O_5$, remainder $Ga_2O_3$.
8. 40 to 50 mole percent $As_2O_5$, ratio $Ga_2O_3/As_2O_5$ from 0.5 to 1.1, remainder boron oxide.

In many of the above compositions, $In_2O_3$ can replace $Ga_2O_3$ with excellent results.

9. 25 to 50 mole percent $As_2O_5$, ratio $In_2O_3/As_2O_5$ from 0.7 to 1.0, remainder oxides of lead and/or zinc.

Useful glasses also result if thallium oxide replaces the $Ga_2O_3$.

10. 25 to 45 mole percent $As_2O_5$, ratio $Tl_2O_3/As_2O_5$ from 0.5 to 2.0, remainder molybdenum oxide and/or tungsten oxide.
11. 20 to 50 mole percent $As_2O_5$ ratio $PbO/As_2O_5$ from 0.5 to 2.0, remainder molybdenum oxide or tungsten oxide.
12. 30 to 50 mole percent $As_2O_5$ ratio $Bi_2O_3/As_2O_5$ from 0.5 to 1.0, remainder tungsten oxide.

Much of the stability of these glasses is believed to result from the formation of mixed oxide compounds such as $GaAsO_4$ and $InAsO_4$ with their highly stable quartz-like structure.

The desirable properties of the glasses described above are advantageously used in a variety of devices. A typical structure is the metal-insulator-semiconductor (MIS) structure shown in FIG. 1. The MIS structure 10 comprises means to apply electrical energy to a metal field plate 13 including electrical terminal 11 and conductor 12. The insulator 14 is made in accordance with the invention and comprises arsenate glass. The composition of the arsenate glass is preferably such that the expansion coefficient matches (usually within 30 percent) the expansion coefficient of the semiconductor 15 used. An ohmic contact 16 completes the circuit.

Figure 2:
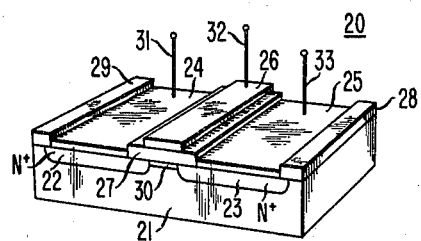
FIG. 2 shows a diagram of an insulated-gate field-effect transistor.

FIG. 2 is a diagram of a typical insulated-gate field-effect transistor 20. The device consists of a p-type semiconductor substrate 21 with two regions (source 22 and drain 23) of n+ material. Metal electrodes cover the source region 24 and the drain region 25. A metal electrode 26 called the gate electrode covers an insulating region 27 made in accordance with the invention. Other insulating regions may also be made of arsenate glass. The narrow region below the gate insulator 27 is usually called the channel 30 or surface inversion layer. Electrical contacts include the source electrical contact 31, the gate electrical contact 30 and the drain electrical contact 33.

Figure 3:
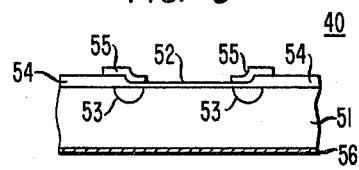
FIG. 3 shows a side view of a Schottky-barrier photodiode.

FIG. 3 shows a typical Schottky-barrier photodiode 40 composed of n-type silicon substrate 51 with a thin PtSi film (about 100 Angstroms) 52 and diffused guard ring 53. Insulator material 54 is also shown on each side of the photodiode as well as conductor material (usually Al) 55. An ohmic contact 56 is located at the bottom of the photodiode.

Figure 4:
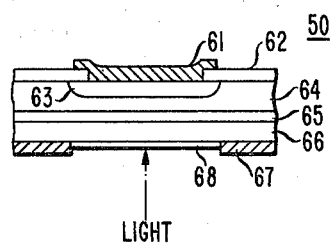
FIG. 4 shows a cross-section view of an indium phosphide photodiode.

FIG. 4 shows an indium phosphide photodetector 50 with top contact 61, dielectric 62 and p+ diffusion regions 63. Below the diffusion region, there is a n⁻ InGaAs region 64, a n-InP buffer region 65 and a n-InP substrate 66. There is also a back contact 67 and an optical coating 68. Both the optical coating and the dielectric are advantageously comprised of pentavalent arsenic oxide glass formulated in accordance with the invention.

Other useful devices advantageously made in accordance with the invention are light-emitting diodes, lasers, solar cells, etc.

What is claimed is:

1. A process for fabricating a device comprising the step of covering at least part of at least one surface with a layer of glass by particle bombardment of a glass target characterized in that the layer of glass consists essentially of 10 to 50 mole percent pentavalent arsenic oxide remainder an oxide substance consisting essentially of at least one metal oxide selected from the group consisting of the oxides of indium, thallium, gallium, boron, zinc, cadmium, copper, germanium, phosphorus, tellurium, lead, bismuth, sodium, potassium, rubidium, cesium, and tellurium and the glass target is made by heating a mixture consisting essentially of a source of pentavalent arsenic and a source of oxide substance to a temperature between 1225 and 1350 degrees C. for at least five minutes in which the source of pentavalent arsenic is arsenic acid.

2. The process of claim 1 in which the particle bombardment is a sputtering procedure or an E-beam procedure.

3. The process of claim 1 in which the glass layer consists essentially of 20 to 50 mole percent $As_2O_5$, mole ratio of $Ga_2O_3/As_2O_5$ from 0.67 to 1.11, remainder oxides of at least one metal selected from the group consisting of silver, copper and thallium.

4. The process of claim 1 in which the glass layer consists essentially of 33 to 50 mole percent $As_2O_5$, mole ratio of $Ga_2O_3/As_2O_5$ from 0 to 1.0, remainder oxides of at least one metal selected from the group consisting of lithium, potassium, sodium, rubidium and cesium.

5. The process of claim 1 in which the glass layer consists essentially of 15 to 50 mole percent $As_2O_5$, mole ratio of $Ga_2O_3/As_2O_5$ from 0.5 to 1.11, remainder oxide of at least one metal selected from the group consisting of beryllium, barium, cadmium, lead, strontium and zinc.

6. The process of claim 1 in which the glass layer consists essentially of 15 to 50 mole percent $As_2O_5$, mole ratio of $Ga_2O_3/As_2O_5$ from 0.5 to 1.4, remainder oxides of at least one metal selected from the group consisting of bismuth, indium, molybdenum and vanadium.

7. The process of claim 1 in which the glass layer consists essentially of 10 to 50 mole percent $As_2O_5$, mole ratio of $Ga_2O_3/As_2O_5$ from 0 to 1.35, remainder $TeO_2$.

8. The process of claim 1 in which the glass layer consists essentially of 20–38 mole percent $As_2O_5$, mole ratio $Ga_2O_5/As_2O_5$ from 0.75 to 1.6, remainder $GeO_2$.

9. The process of claim 1 in which the glass layer consists essentially of 10–30 mole percent $As_2O_5$, 70–90 mole percent $GeO_2$, remainder $Ga_2O_3$.

10. The process of claim 1 in which the glass layer consists essentially of 40 to 50 mole percent $As_2O_5$, mole ratio of $Ga_2O_3/As_2O_5$ from 0.5 to 1.1, remainder $B_2O_3$.

11. The process of claim 1 in which the glass layer consists essentially of 15 to 50 mole percent $As_2O_5$, mole ratio of $In_2O_3/As_2O_5$ from 0.5 to 1.11, remainder oxide of at least one metal selected from the group consisting of lead and zinc.

12. The process of claim 1 in which the glass layer consists essentially of 25 to 45 mole percent $As_2O_5$, mole ratio of $Tl_2O_3/As_2O_5$ from 0.5 to 2.0, remainder oxides of at least one metal selected from the group consisting of molybdenum and tungsten.

13. The process of claim 1 in which the glass layer consists essentially of from 20 to 50 mole percent $As_2O_5$, mole ratio of $PbO/As_2O_5$ from 0.5 to 2.0, remainder oxides of at least one metal selected from the group consisting of molybdenum and tungsten.

14. The process of claim 1 in which the glass layer consists essentially of 30 to 50 mole percent $As_2O_5$, mole ratio of $Bi_2O_3/As_2O_5$ from 0.5 to 1.0, remainder tungsten oxide.

15. The process of claim 1 in which the device is a semiconductor device.

16. The process of claim 1 in which the mixture is heated to a temperature between 1275 and 1325 degrees C. for 5 minutes to two hours.

17. The process of claim 15 in which the semiconductor device has a metal-insulator-semiconductor structure.

18. The process of claim 15 in which the semiconductor device is an insulator gate field-effect transistor.

19. The process of claim 15 in which the semiconductor device is an optical semiconductor device.

20. The process of claim 19 in which the optical semiconductor device is a Schottky-barrier photodiode.

21. The process of claim 19 in which the optical semiconductor device is an indium phosphide photodetector.

22. The process of claim 19 in which the optical semiconductor device is selected from a group consisting of light-emitting diode, laser and solar cell.

23. A process for fabricating a device comprising the step of covering at least part of at least one surface with a layer of glass by particle bombardment of a glass target characterized in that the layer of glass consists essentially of 10 to 50 mole percent $As_2O_5$, the mole ratio of metallic oxide substance to $As_2O_5$ is from 0 to 2.0, where the metallic oxide substance is at least one metal oxide selected from the group consisting of $Ga_2O_3$, $In_2O_3$, $Tl_2O_3$, $PbO$, and $Bi_2O_3$, remainder oxides of at least one metal selected from the group consisting of silver, copper, thallium, lithium, potassium, sodium, rubidium, cesium, beryllium, barium, cadmium, lead, strontium, zinc, bismuth, indium, molybdenum, vanadium, tellerium, germanium, boron, and tungsten.

24. A process of claim 23 in which the layer of glass consists essentially of 20 to 50 mole percent $As_2O_5$, mole ratio of $Ga_2O_3/As_2O_5$ from 0.67 to 1.11, remainder oxides of at least one metal selected from the group consisting of silver, copper, and thallium.

25. The process of claim 23 in which the glass layer consists essentially of 33 to 50 mole percent $As_2O_5$, mole ratio of $Ga_2O_3/As_2O_5$ from 0 to 1.0, remainder oxides of at least one metal selected from the group consisting of lithium, potassium, sodium, rubidium and cesium.

26. The process of claim 23 in which the glass layer consists essentially of 15 to 50 mole percent $As_2O_5$, mole ratio of $Ga_2O_3/As_2O_5$ from 0.5 to 1.11, remainder oxide of at least one metal selected from the group consisting of beryllium, barium, cadmium, lead, strontium, and zinc.

27. The process of claim 23 in which the glass layer consists essentially of 15 to 50 mole percent $As_2O_5$, mole ratio of $Ga_2O_3/As_2O_5$ from 0.5 to 1.4, remainder oxides of at least one metal selected from the group consisting of bismuth, indium, molybdenum and vanadium.

28. The process of claim 23 in which the glass layer consists essentially of 10 to 50 mole percent $As_2O_5$, mole ratio of $Ga_2O_3/As_2O_5$ from 0 to 1.35, remainder $TeO_2$.

29. The process of claim 23 in which the glass layer consists essentially of 20–38 mole percent $As_2O_5$, mole ratio $Ga_2O_5/As_2O_5$ from 0.75 to 1.6, remainder $GeO_2$.

30. The process of claim 23 in which the glass layer consists essentially of 10–30 mole percent $As_2O_5$, 70–90 mole percent $GeO_2$, remainder $Ga_2O_3$.

31. The process of claim 23 in which the glass layer consists essentially of 40 to 50 mole percent $As_2O_5$, mole ratio of $Ga_2O_3/As_2O_5$ from 0.5 to 1.1, remainder $B_2O_3$.

32. The process of claim 23 in which the glass layer consists essentially of 15 to 50 mole percent $As_2O_5$, mole ratio of $In_2O_3/As_2O_5$ from 0.5 to 1.11, remainder oxide of at least one metal selected from the group consisting of lead and zinc.

33. The process of claim 23 in which the glass layer consists essentially of 25 to 45 mole percent $As_2O_5$, mole ratio of $Tl_2O_3/As_2O_5$ from 0.5 to 2.0, remainder oxides of at least one metal selected from the group consisting of molybdenum and tungsten.

34. The process of claim 23 in which the glass layer consists essentially of from 20 to 50 mole percent $As_2O_5$, mole ratio of $PbO/As_2O_5$ from 0.5 to 2.0, remainder oxides of at least one metal selected from the group consisting of molybdenum and tungsten.

35. The process of claim 23 in which the glass layer consists essentially of 30 to 50 mole percent $As_2O_5$, mole ratio of $Bi_2O_3/As_2O_5$ from 0.5 to 1.0, remainder tungsten oxide.

36. The process of claim 23 in which the device is a semiconductor device.

37. The process of claim 36 in which the semiconductor device has a metal-insulator-semiconductor structure.

38. The process of claim 36 in which the semiconductor device is an insulator gate field-effect transistor.

39. The process of claim 36 in which the semiconductor device is an optical semiconductor device.

40. The process of claim 39 in which the optical semiconductor device is a Schottky-barrier photodiode.

41. The process of claim 39 in which the optical semiconductor device is an indium phosphide photodetector.

42. The process of claim 39 in which the optical semiconductor device is selected from a group consisting of a light-emitting diode, laser and solar cell.

43. The process of claim 23 in which the glass target is made by heating a mixture consisting essentially of a source of pentavalent arsenic and a source of at least one of the oxides of metals to a temperature between 1225 and 1350 degrees C. for at least five minutes in which the source of pentavalent arsenic is arsenic acid.

44. The process of claim 43 in which the mixture is heated to a temperature between 1275 and 1325 degrees C. for five minutes to two hours.

45. The process of claim 23 in which the particle bombardment is a sputtering procedure or an E-beam procedure.

* * * * *